R. Hunt,
Horse Power.
Nº 14,547.  Patented Mar. 25, 1856.
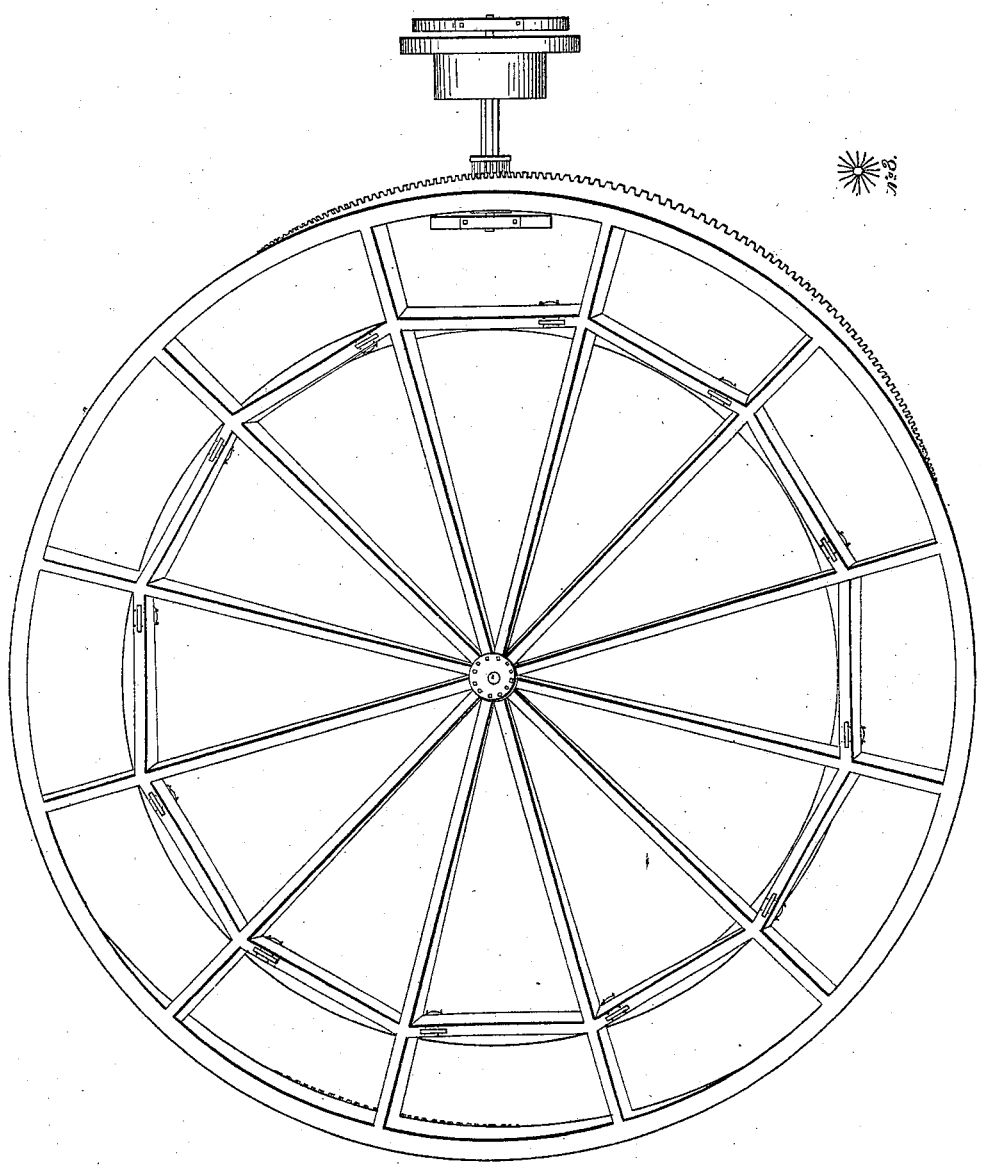

UNITED STATES PATENT OFFICE.

RICHARD HUNT, OF FREEPORT, ILLINOIS.

HORSE-POWER.

Specification of Letters Patent No. 14,547, dated March 25, 1856.

*To all whom it may concern:*

Be it known that I, RICHARD HUNT, of Freeport, in the county of Stevenson and State of Illinois, have invented certain new and useful Improvements in Horse-Powers; and I do hereby declare that the following is a full, clear, and exact description of the same, reference being had to the accompanying drawings, making a part of this specification.

In the use of a large master wheel for horse powers, it is liable to twist by the oblique and irregular draft of the horses, which twisting is usually termed "wabbling of the wheel." This motion tends to strain the wheel and cut the gearing, it also causes very irregular strain upon the pinion or trundle to which the large wheel gives motion, and as a necessary consequence the pinion or trundle is frequently broken. To remedy these defects very heavy frames have been supplied to support the wheel and trundle, and the wheel itself has been made strong heavy and expensive, and has been supported by a shaft, which rested in bearings in the upper and lower timbers of the frame, or upon friction rolls on an independent frame, either of which are cumbersome and expensive.

It is the object of my invention to render the draft wheel sufficiently rigid and strong in itself without adding to its weight and expense, or supporting it by an expensive frame, and I have accomplished this object by fitting the wheel near its periphery with a series of conical supporting wheels, running on radial bearings or axles, and placing an annular track beneath the master wheel for the conical supporting wheels to run on, these conical wheels and the track effectually prevent the draft wheel from wabbling, while a center pivot on which the eye of the wheel turns, keep it concentric with the track, without any further frame work, or double bearings of its shaft.

The conical wheels and annular track, are simple and inexpensive and not liable to get out of repair. By the making my wheels travelers and placing their axles or journals in the plane of the rim wheel, I am enabled by this arrangement of said travelers, to lower the rim wheel sufficiently to admit of the horse or team employed, stepping over said rim wheel (in hitching up,) with ease and dispensing with the necessity of either canting the wheel or separating it for that purpose.

The following is a description of my improvement.

This horse power is constructed in the following manner, to wit: There is first a bed work or rim marked No. 1 made of inch boards cut in the form of fellies eight inches wide placed on short posts inserted in the ground about two feet apart; this rim is constructed double so as to break joints; this rim or bed work is thirty four feet in diameter. On this bedwork is an iron rail (No. 2) extending around on the top of the rim and two inches from the outer edge of the same. The rail is made of band iron three inches wide put on the rim with wood screws.

In the center of the bedwork or rim seventeen and a half feet from the outer edge of the same is a post set four feet in the ground. On the top of this post is a mortise four inches square, six inches deep. Into this mortise is inserted a square piece of timber to fill the mortise projecting above six inches the top of which is oval. There is a cast iron center (No. 3) made with a socket or hollow to fit on to the oval timber above mentioned. This cast iron is four inches diameter and six inches deep with twelve arms extending eight inches at equal distances, together forming one casting making the center iron in all twenty inches diameter placed upon the oval center. On the underside of this iron center is a two inch plank two feet in diameter through which there is a hole for the projection of the center oval pointed timber into the center casting. On the top of the center casting is also a two inch plank two feet in diameter. This center may all be made of iron without the plank but will be more expensive. This center iron weighs twenty pounds. This horse or drive wheel is forty feet in diameter with twelve arms twenty feet long. These arms are made of timber six inches wide and eight inches deep. These twelve arms are fitted and inserted into the spaces in the iron center firmly. There is an iron bolt inserted through the end of each arm and likewise through the two planks confined by a screw and nut. Next there is a rim made of inch boards or two inch plank or it may be made of timber formed into a circle into which the outer ends of these twelve arms are placed at equal distances. This rim is eight inches square put together with spikes, bolts or nails. There are likewise cross timbers mortised into each arm five feet from the rim toward the center so constructed that a cast iron wheel may be inserted into the center of each of the cross timbers making in all twelve wheels. These wheels are two feet in diameter made with spokes, rim and hub or otherwise. These wheels may be made of wood with band iron for tire. If made of cast iron as above described they will weigh about twenty pounds each. This horse or drive wheel (No. 4) is placed upon the bedwork or rim so that the twelve wheels will play or run directly on the iron rail of the bedwork so that the rotary wheels will follow each other in succession while driven by the horse or drive wheel. This wheel is so constructed that the horses are hitched to the rim of the wheel and travel inside of the same which shortens the distance of travel and gives the wheel more speed than where the horse travels outside of the wheel and yet have all the lever purchase required owing to the twelve wheels on which the main wheel performs her revolution combining power with speed so that one horse has the power of four or equal to a four horse power. This wheel is capable of driving saw or grist mill and any other machinery. On the underside of this horse wheel are inserted wooden cogs or iron segments which mesh into a wooden trundle head or iron pinion wheel a size in proportion to the kind of machinery to be run or the wheel may be run with a band without cogs.

I have now given a description of a forty foot wheel but for light work such as a turning lathe, &c., a thirty foot wheel is large enough and in case of saw and grist mills if the wheel is constructed to fifty feet instead of forty it is still better, giving more power.

Having thus fully described my invention what I claim therein as new and desire to secure by Letters Patent is—

The combination of the central pivot and annular track secured to the ground as described, with a master wheel fitted with a central eye and an annular series of conical supporting wheels, whereby the usual supporting frame to combine these several parts is dispensed with, while the requisite rigidity and steadiness of the master wheel is maintained as set forth.

RICHARD HUNT.

Witnesses:
 WM. PRESTON,
 L. W. GAITEAN.